United States Patent
Rodríguez-Serrano et al.

(10) Patent No.: US 9,767,381 B2
(45) Date of Patent: Sep. 19, 2017

(54) SIMILARITY-BASED DETECTION OF PROMINENT OBJECTS USING DEEP CNN POOLING LAYERS AS FEATURES

(71) Applicant: Xerox Corporation, Norwalk, CT (US)

(72) Inventors: José A. Rodríguez-Serrano, Grenoble (FR); Albert Gordo Soldevila, Grenoble (FR)

(73) Assignee: XEROX CORPORATION, Norwalk, CT (US)

( * ) Notice: Subject to any disclaimer, the term of this patent is extended or adjusted under 35 U.S.C. 154(b) by 204 days.

(21) Appl. No.: 14/861,386

(22) Filed: Sep. 22, 2015

(65) Prior Publication Data
US 2017/0083792 A1    Mar. 23, 2017

(51) Int. Cl.
| | |
|---|---|
| *G06K 9/62* | (2006.01) |
| *G06N 3/04* | (2006.01) |
| *G06N 3/08* | (2006.01) |
| *G06F 17/30* | (2006.01) |
| *G06T 7/10* | (2017.01) |

(52) U.S. Cl.
CPC ..... *G06K 9/6215* (2013.01); *G06F 17/30259* (2013.01); *G06F 17/30274* (2013.01); *G06K 9/628* (2013.01); *G06K 9/6256* (2013.01); *G06N 3/04* (2013.01); *G06N 3/084* (2013.01); *G06T 7/10* (2017.01); *G06K 2209/15* (2013.01); *G06T 2210/12* (2013.01)

(58) Field of Classification Search
CPC .... G06K 9/6215; G06K 9/628; G06K 9/6256; G06K 2209/15; G06T 7/10; G06T 2210/12; G06F 17/30259; G06F 17/30274; G06N 3/04; G06N 3/084
See application file for complete search history.

(56) References Cited

U.S. PATENT DOCUMENTS

| | | | | |
|---|---|---|---|---|
| 5,990,941 | A | * | 11/1999 | Jackson ........... G08B 13/19626 348/147 |
| 6,285,393 | B1 | * | 9/2001 | Shimoura ............ G05D 1/0246 348/119 |
| 7,650,011 | B2 | * | 1/2010 | Yang .................. G06K 9/00261 382/103 |

(Continued)

OTHER PUBLICATIONS

Babenko, et al., "Neural codes for image retrieval," ECCV, pp. 1-16, (2014).

(Continued)

*Primary Examiner* — Samir Ahmed
(74) *Attorney, Agent, or Firm* — Fay Sharpe LLP

(57) ABSTRACT

A system and method provide object localization in a query image based on a global representation of the image generated with a model derived from a convolutional neural network. Representations of annotated images and a query image are each generated based on activations output by a layer of the model which precedes the fully-connected layers of the neural network. A similarity is computed between the query image representation and each of the annotated image representations to identify a subset of the annotated images having the highest computed similarity. Object location information from at least one of the subset of annotated images is transferred to the query image and information is output, based on the transferred object location information.

20 Claims, 5 Drawing Sheets

(56) References Cited

U.S. PATENT DOCUMENTS

| | | | | |
|---|---|---|---|---|
| 8,456,527 | B2* | 6/2013 | Elangovan | G06K 9/6202 348/142 |
| 8,880,563 | B2* | 11/2014 | Lin | G06F 17/30259 382/128 |
| 2008/0085044 | A1* | 4/2008 | Zhou | G06K 9/00 382/131 |
| 2009/0028440 | A1* | 1/2009 | Elangovan | G06K 9/6202 382/216 |
| 2011/0216201 | A1* | 9/2011 | McAndrew | G06T 7/0018 348/148 |
| 2013/0182909 | A1 | 7/2013 | Rodriguez-Serrano | |
| 2014/0056520 | A1 | 2/2014 | Rodriguez Serrano | |
| 2014/0270350 | A1 | 9/2014 | Rodriguez-Serrano et al. | |

OTHER PUBLICATIONS

Chatfield, et al., "Return of the devil in the details: Delving deep into convolutional nets," British Machine Vision Conference, pp. 1-12 (2014).

Felzenszwalb, et al., "Object Detection with Discriminatively Trained Part Based Models," *TPAMI*, 32(9), pp. 1627-1645 (2010).

Hoffer, et al., "Deep metric learning using Triplet network," *arXiv*: 1412.6622, pp. 1-8 (2014).

Jia, Y, et al., "Caffe: Convolutional Architecture for Fast Feature Embedding," *arXiv preprint arXiv*:1408.5093, pp. 675-678 (2014).

Johnson, et al., "Clustered pose and nonlinear appearance models for human pose estimation," Proc. 21st British Machine Vision Conference (BMVC2010), pp. 1-11 (2010).

Krizhevsky, et al., "Imagenet classification with deep convolutional neural networks," NIPS, pp. 1097-1105 (2012).

U.S. Appl. No. 14/691,021, filed Apr. 20, 2015, Perronnin, et al.

U.S. Appl. No. 14/505,031, filed Oct. 2, 2014, Gaidon, et al.

U.S. Appl. No. 14/557,891, filed Dec. 2, 2014, Tariq, et al.

Ren, et al., "Object Detection Networks on Convolutional Feature Maps," *arXiv*:1504.06066, pp. 1-9 (2015).

Rodriguez-Serrano, et al., "Predicting an object location using a global image representation," ICCV, pp. 1729-1736 (2013).

Simonyan, et al., "Very Deep Convolutional Networks for Large-Scale Image Recognition," arxiv 1409.1556, pp. 1-14 (2014).

Tuytelaars, et al., "Domain adaptation: How far are we from the solution?" TASK-CV: Transferring and Adapting Source Knowledge in Computer Vision, in conjunction with the ECCV 2014, Zurich, pp. 1-39 (2014), downloaded at http://www.cvc.uab.es/adas/task-cv2014/wp-content/uploads/2014/10/Tuytelaars_talk.pdf.

Visual Geometry Group Homepage, pp. 1-2, downloaded at www.robots.ox.ac.uk/~vgg/research/very_deep//, on Aug. 31, 2015.

Yosinski, et al., "How transferable are features in deep neural networks?" NIPS, pp. 3320-3328 (2014).

Zeiler, et al., "Visualizing and understanding convolutional networks," ECCV, pp. 818-833 (2014).

* cited by examiner

SIMILARITY-BASED DETECTION OF PROMINENT OBJECTS USING DEEP CNN POOLING LAYERS AS FEATURES

BACKGROUND

The exemplary embodiment relates to object localization and finds particular application in a system and method for detection of prominent objects in images.

Object localization finds application in a variety of tasks, such as image thumbnailing, product identification on small screens, categorization, and information extraction. Thumbnailing is used to produce a 'thumbnail' of an image which focuses on a region of the image. Rather than reducing the size of the whole image, it tends to be more informative if the thumbnail shows the prominent object. Product identification is useful on smartphones, for example, where the size of the screen makes it difficult to see an object which occupies a small portion of the screen. Fine-grained categorization is a challenging many-class vision task where the goal is to assign an image of an "entry-level" class to its specific sub-class (e.g., to classify 200 bird species or 120 dog breeds). Detecting the prominent subject first generally has a positive impact in the categorization.

In object localization, the input image is expected to contain an object (or more than one), and the aim is to output information about the location of each object, such as the rectangle that tightly encompasses the object. In some instances, it may be desirable to identify a single, prominent object. The definition of "prominent object" may be specified by examples: for example, training dataset of images may be provided with their corresponding annotations of the true object locations.

One efficient method to detect prominent objects in images uses a similarity-based approach, as described in J. A. Rodriguez-Serrano, et al., "Predicting an object location using a global image representation," ICCV, pp. 1729-1736, 2013, hereinafter, Rodriguez-Serrano 2013, and in U.S. Pub. Nos. 20140056520 and 20130182909. This method, referred to herein as data-driven detection (DDD), encodes each image using a single, spatially-variant feature vector, and expresses detection as a "query" to an annotated training set: given a new image, the method first computes its similarity to all images in the training set, then selects the images with highest similarity (the "neighbors"). The output rectangle denoting the location of the object in the query image is computed as a simple function of the neighbors' rectangles. The method is efficient for several object detection tasks, since it expresses detection as an image retrieval task and leverages a fast image retrieval implementation. Other methods are based on probability maps, as described, for example, in U.S. Pub. No. 20140270350.

The success of the DDD method relies on several factors, such as:

1. Localized representation: for similarity-based localization, two feature vectors that represent two objects (of the same class but slightly different appearance) in the same location have to be very similar. Hence, the feature encoding needs to be sensitive to the location of the object. This is in contrast with other computer vision tasks, such as image categorization, where features need to encode the appearance and yet be robust to changes in location. DDD achieves the encoding of location information by using Fisher vectors with dense spatial pyramids or probability maps, which can be seen as very localized mid-level features.

2. Supervised or semantic representation: While DDD obtains good results when used with standard features, such as Fisher vectors, an improvement can be obtained when the representation involves some supervised learning to add task-related information or semantics through mid-level attributes. In one variant of DDD, supervision is achieved by adopting a "learning to rank" approach, where a metric learning algorithm finds a projection of the data which improves the retrieval accuracy. In another variant, a mid-level feature is built from the output of a localized foreground/background classifier, discriminatively learned on the training set. The latter can be interpreted as very localized attributes.

3. Compression: Since DDD expresses detection as a retrieval problem, compression of the feature vectors is beneficial in order to ensure a fast lookup. DDD offers two variants. In the case of metric learning, a low-rank metric learning algorithm is used which allows working in a projected (lower-dimensional) subspace. In the case of probability maps, they are already a compact representation (e.g., a maximum of 2500 dimensions, which is several orders of magnitude smaller than standard Fisher vectors).

While the DDD system provides a very good performance, comparable to methods such as the DPM method of Felzenszwalb, "Object Detection with Discriminatively Trained Part Based Models," *TPAMI*, 32(9), 1627-1645, 2010, it would be advantageous to provide a method of object localization which takes spatial information into account effectively in generating a global representation of the image while also providing a compact representation.

INCORPORATION BY REFERENCE

The following references, the disclosures of which are incorporated herein in their entireties by reference, are mentioned:

U.S. Pub. No. 20140270350, published Sep. 18, 2014, entitled DATA DRIVEN LOCALIZATION USING TASK-DEPENDENT REPRESENTATIONS, by Jose A. Rodriguez Serrano, et al.

U.S. Pub. No. 20130182909, published Jul. 18, 2013, entitled IMAGE SEGMENTATION BASED ON APPROXIMATION OF SEGMENTATION SIMILARITY, by Jose A. Rodriguez Serrano.

U.S. Pub. No. 20140056520, published Feb. 27, 2014, entitled REGION REFOCUSING FOR DATA-DRIVEN OBJECT LOCALIZATION, by Jose A. Rodriguez Serrano.

U.S. application Ser. No. 14/691,021, filed Apr. 20, 2015, entitled FISHER VECTORS MEET NEURAL NETWORKS: A HYBRID VISUAL CLASSIFICATION ARCHITECTURE, by Florent C. Perronnin, et al.

U.S. application Ser. No. 14/557,891, filed on Dec. 2, 2014, entitled ADAPTED VOCABULARIES FOR MATCHING IMAGE SIGNATURES WITH FISHER VECTORS, by Usman Tariq, et al.

BRIEF DESCRIPTION

In accordance with one aspect of the exemplary embodiment, a method for object localization in a query image is provided. Annotated images are each annotated with object location information. An annotated image representation is provided or each of the set of annotated images. The representation is based on activations output by a selected layer of a model derived from part of a trained neural network. For a query image, a query image representation is generated in the same manner, based on activations output by the selected layer of the model. A subset of the annotated images is identified. This is achieved by computing a similarity between the query image representation and each of the annotated image representations and selecting the subset of the annotated images based on their computed similarity. Object location information is then transferred from at least one of the subset of annotated images to the query image. Information based on the transferred object location information is output.

At least one of the generating of the query image representation, identifying the subset of the annotated images, transferring object location information, and outputting information may be performed with a processor.

In accordance with another aspect of the exemplary embodiment, a system for object localization in a query image includes memory which stores a model derived from a trained neural network. The model includes a sequence of convolutional layers which each receive, as input, output activations of a prior convolutional layer (or an image in the case of a first of the convolutional layers). A representation generator generates a representation of a query image based on the activations of a selected one of the convolutional layers for the query image. The representation generator also generates an annotated image representation for each of a set of annotated images in the same manner: based on activations output by the selected layer of the model for the annotated image. The annotated images are each annotated with object location information. A retrieval component retrieves a subset of similar images from the set of annotated images, based on a similarity between respective representations of the annotated images and the query image. A segmentation component transfers the object location information from at least one of the subset of annotated images to the query image. An output component outputs information based on the transferred object location information. A processor implements the representation generator, retrieval component, segmentation component, and output component.

In accordance with another aspect of the exemplary embodiment, a method for object localization in a query image includes adding a new layer to a pre-trained neural network to generate a model. The model includes a sequence of convolutional layers which each act on the output of a respective previous layer. The new layer is positioned after a last of the convolutional layers in the sequence. Weights of the new layer are updated, as well as weights of the convolutional layers of the model, by backpropagation. For each of a set of annotated images, an annotated image representation is generated, based on activations output by the new layer of the model. The annotated images are each annotated with object location information. For a query image, a query image representation is generated, based on activations output by the new layer of the model. A subset of the annotated images is identified by computing a similarity between the query image representation and each of the annotated image representations. Object location information from at least one of the subset of annotated images is transferred to the query image and information based on the transferred object location information is output.

At least one of the updating weights, generating the image representations, identifying a subset of the annotated images, transferring object location information, and outputting information may be performed with a processor.

DETAILED DESCRIPTION

Aspects of the exemplary embodiment relate to a system and method for data-driven detection (DDD) of prominent objects in images using a similarity-based approach. In the exemplary embodiment, an image representation is based on a real-valued tensor, such as a vector, containing the activations output from a layer of a model derived from part of a trained deep convolutional neural network (CNN), such as a max-pooling layer. The CNN, which has been pre-trained for an image classification task, is thus used as a feature extractor for the DDD task. The CNN-derived features show an improvement over Fisher features and probability maps for DDD.

Figure 1:
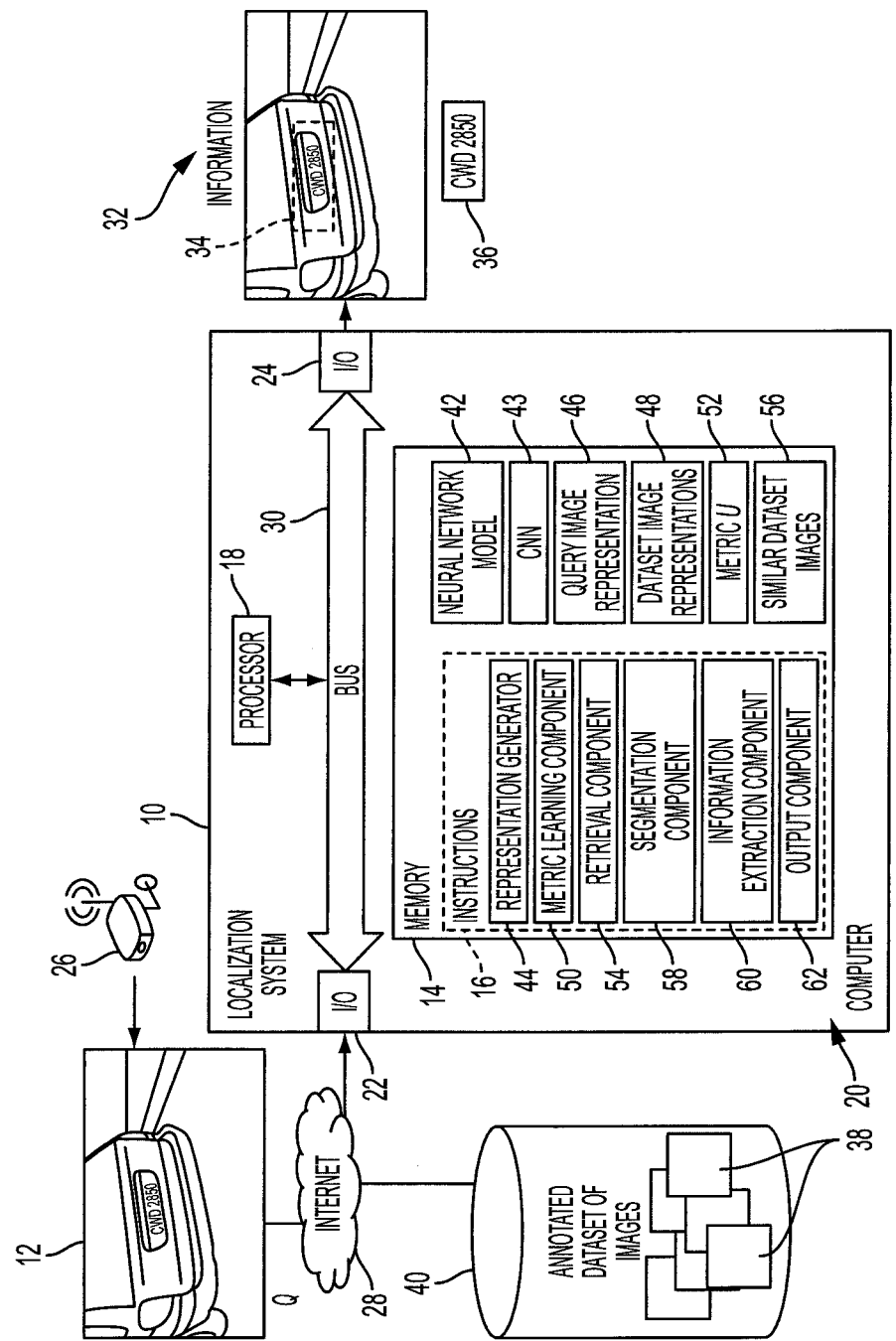
FIG. 1 is a functional block diagram of a system for object localization in accordance with one aspect of the exemplary embodiment.

FIG. 1 illustrates an exemplary computer-implemented system 10 for object localization in a query image 12. The system includes memory 14, which stores software instructions 16 for performing the method described with reference to FIG. 2 and a processor 18 in communication with the memory for executing the instructions. The system may be resident on one or more computing devices, such as the illustrated computer 20. One or more input output devices (I/O) 22, 24 allow the system 10 to communicate with external devices, such as the illustrated image capture device 26, via wired or wireless connections 28, such as a local area network or a wide area network such as the Internet. Hardware components 14, 18, 22, 24 of the system communicate via a data/control bus 30.

Given an input query image 12, the system outputs information 32, such as a location 34 of a prominent object in the query image, and/or information 36 extracted therefrom. In the system illustrated in FIG. 1, the image 12 is an image captured of a vehicle and the location 34 is a bounding box, e.g., in the shape of a rectangle, which is predicted to contain the license plate in the image. In this case, the information 36 extracted from the bounding box 34 may be textual information, such as the license number of the vehicle.

The system has access to N annotated images 38, forming a dataset 40, which may be stored in local memory 14 or in remote memory accessible to the system. N can be any number such as at least 10, at least 100, at least 1000, or at least 10,000, or more. Each of the annotated images 38 in the dataset 40 is annotated with information, such as a bounding box (analogous to the bounding box 34 generated for the query image), but in this case, identifying the true location of a prominent object in a class of interest. These annotations may be manual annotations. For example, in the license plate case, the annotated images may be images of different types of vehicle (which may have been captured by the same or a similar camera to camera 26), with annotations in the form of coordinates specifying a bounding box which closely surrounds the respective license plate.

The system 10 includes, in local or remote memory, a model 42 derived from a convolutional neural network (CNN) 43, The CNN 43 has previously been trained to classify images into predefined visual classes using a labeled training set of images (not shown). The training images for this training set may be drawn from a large dataset such as ImageNet™, and need not be specific to the particular object localization task being performed by the system 10.

The instructions 16 include a representation generator 44 which uses the trained CNN model 42 to produce a compact representation 46 of the query image 12. Representations 48 are also generated of the dataset images 38 in the same manner. Optionally, a metric learning component 50 uses a metric learning algorithm to learn a metric 52 for projecting the representations 46, 48 into a feature space (e.g., one of lower dimensionality) in which the output annotation 34 is more precise. In one embodiment the metric learning component 50 jointly learns a metric for projecting the image representations 46, 48 into the new feature space and adapts weights of the convolutional layers of the model 42 by backpropagation.

A retrieval component 54 retrieves a set 56 of similar dataset images, by computing a similarity between respective, optionally projected, image representations 46, 48 of the images 12, 38. A segmentation component 58 transfers the bounding box annotations some or all of the retrieved set 56 of similar dataset images to the query image 12 to compute the bounding box 34. An information extraction component 60 optionally extracts information 36 from a region of the image 12 bounded by the bounding box 34. The extracted information may include a license plate number, i.e., a sequence of characters drawn from a finite alphabet, such as the set of letters and numbers. This information may be identified, for example, using optical character recognition (OCR).

While the illustrated information 36 extracted is a license plate number, other types of information are contemplated. For example, the information extraction component 60 may include a classifier which classifies the localized object, e.g., a bird, animal, vehicle, or the like, into one of a predefined set of classes, or outputs a probabilistic assignment over some or all the classes. In another embodiment, the information 36 may simply be a crop of the image 12 which includes the region in the bounding box, or other information extracted therefrom. An output component 62 outputs the information 32.

The computer system 10 may include one or more computing devices 20, such as a desktop, a laptop, palmtop computer, portable digital assistant (PDA), server computer, cellular telephone, tablet computer, pager, computing device integral with or associated with the camera 26, combination thereof, or other computing device capable of executing instructions for performing the exemplary method.

The memory 14 may represent any type of non-transitory computer readable medium such as random access memory (RAM), read only memory (ROM), magnetic disk or tape, optical disk, flash memory, or holographic memory. In one embodiment, the memory 14 comprises a combination of random access memory and read only memory. In some embodiments, the processor 18 and memory 14 may be combined in a single chip. Memory 14 stores instructions for performing the exemplary method as well as the processed data 46, 48, 56, 34, 36.

The network interface 22, 24 allows the computer to communicate with other devices via a computer network, such as a local area network (LAN) or wide area network (WAN), or the internet, and may comprise a modulator/demodulator (MODEM) a router, a cable, and/or Ethernet port.

The digital processor device 18 can be variously embodied, such as by a single-core processor, a dual-core processor (or more generally by a multiple-core processor), a digital processor and cooperating math coprocessor, a digital controller, or the like. The digital processor 18, in addition to executing instructions 16 may also control the operation of the computer 20.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 1 is a high level functional block diagram of only a portion of the components which are incorporated into a computer system 10. Since the configuration and operation of programmable computers are well known, they will not be described further.

Figure 2:
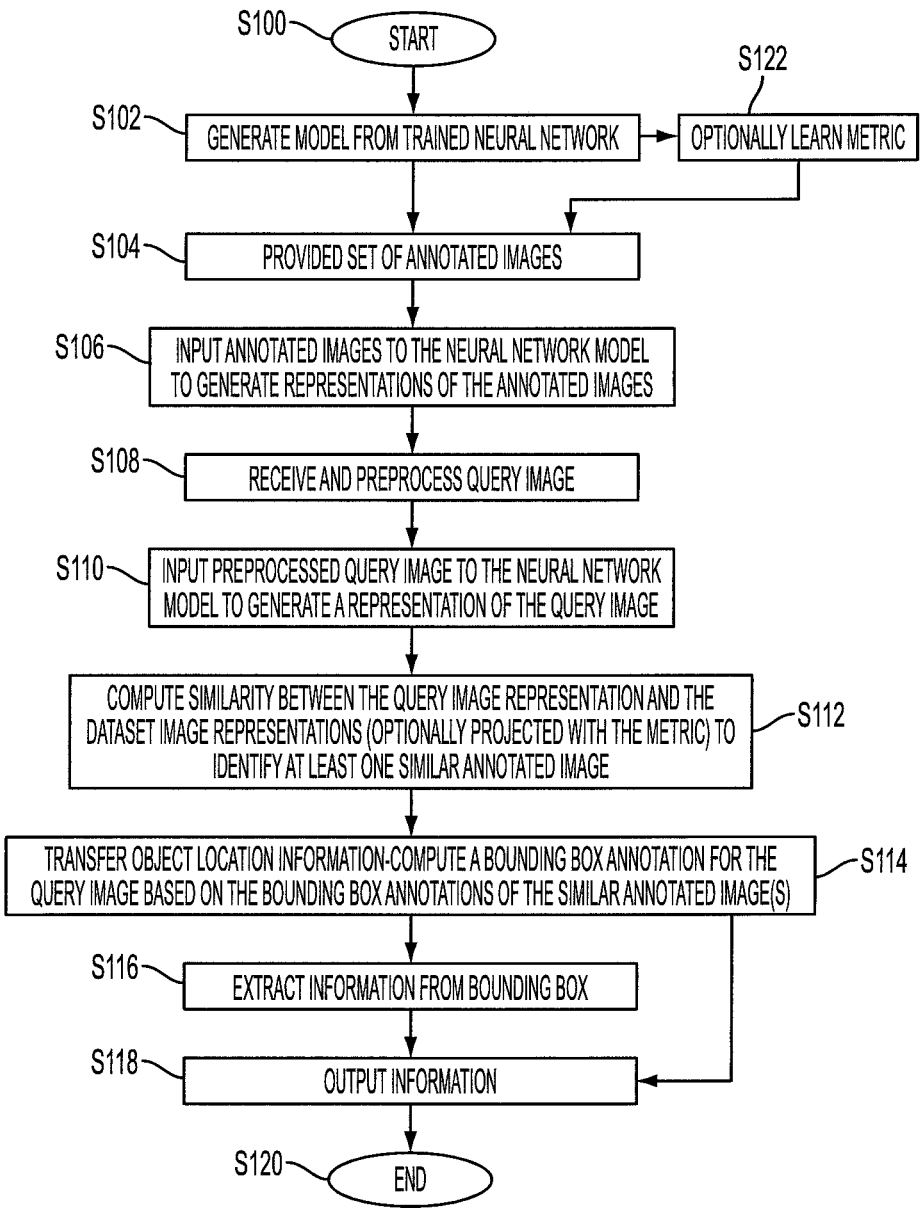
FIG. 2 is a flow chart illustrating a method for object localization in accordance with another aspect of the exemplary embodiment.

FIG. 2 illustrates a method of object localization which may be performed with the exemplary system. The method starts at S100.

At S102, a neural network model 42 is provided. A previously trained neural network 43 may be used directly as the model 42 or the model may be generated by adapting the trained CNN, e.g., by removing the CNN layers not needed for generating the image representations 46, 48. In some embodiments, the CNN 43 may be/have been trained by end-to-end learning of the parameters of the neural network using a set of training images labeled by class.

At S104, a set 40 of annotated images 38 is provided. Each annotated image 38 is annotated with a bounding box which identifies a location of an object of interest.

At S106, the neural network model 42 is used to generate a representation 48 of each of the annotated images 38. These may be stored in memory 14. The representation 48 is derived from the output of a layer of the model 42 that is other than last fully-connected layer (or layers) of the original CNN 43. The layer used for generating the representation can be a convolutional layer, e.g., after max pooling, or an additional layer not in the original CNN 43.

At S108, a query image 12 is received, and may be preprocessed, e.g., by reducing the pixel dimensions to the same as those of the annotated images 38.

At S110, the query image 12 is input to the neural network model 42 at the output of the selected layer of the model is used to generate a representation 46 of the query image, in a similar manner to the annotated images.

At S112, a similarity is computed between the query image representation 46 and the dataset image representations 48 (optionally projected into the new feature space) to identify a subset 56 of one or more similar annotated image(s), i.e., those which have the most similar representations (in the new feature space).

At S114, the bounding box annotations of the annotated image(s) in the set 56 is/are used to compute a bounding box annotation 34 for the query image.

At S116, information 36 may be extracted from the region of the query image 12 contained within the bounding box 34.

At S118, the annotated query image 12 and/or information 36 extracted therefrom, is output.

The method ends at S120.

In some embodiments of the method, the metric 52, such as a matrix, is learned, at S122, on a set of annotated training images. This may include jointly learning the metric and adapting weights of the convolutional layers of the model 42 by backpropagation. The metric learning may take place at any time before embedding the annotated images and query image into the new feature space.

The method illustrated in FIG. 2 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 20, (for example, an internal hard drive of RAM), or may be separate (for example, an external hard drive operatively connected with the computer 20), or may be separate and accessed via a digital data network such as a local area network (LAN) or the Internet (for example, as a redundant array of inexpensive of independent disks (RAID) or other network server storage that is indirectly accessed by the computer 20, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2, can be used to implement the method. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

Further details on the system and method will now be provided.

Images

Images 12, 38 may be received by the system 10 in any convenient file format, such as JPEG, GIF, JBIG, BMP, TIFF, or the like or other common file format used for images and which may optionally be converted to another suitable format prior to processing. Input query images 12 may be stored in memory 14 during processing. Images 12, 38, can be input from any suitable image source 26, such as a workstation, database, memory storage device, such as a disk, image capture device, such as a camera, or the like. In general, each input digital image includes image data for an array of pixels forming the image.

The images 12, 38 may be individual images, such as photographs or video frames. The image data of the image, which is input to the CNN model, may include colorant values for each of the pixels in the image, such as grayscale values, for each of a set of color separations, such as L*a*b* values, or RGB, or be expressed in another other color space in which different colors can be represented. In general, "grayscale" refers to the optical density value of any single color channel, however expressed (L*a*b*, RGB, YCbCr, etc.). The exemplary embodiment may also be used for black and white (monochrome) images.

Convolutional Neural Network

Figure 3:
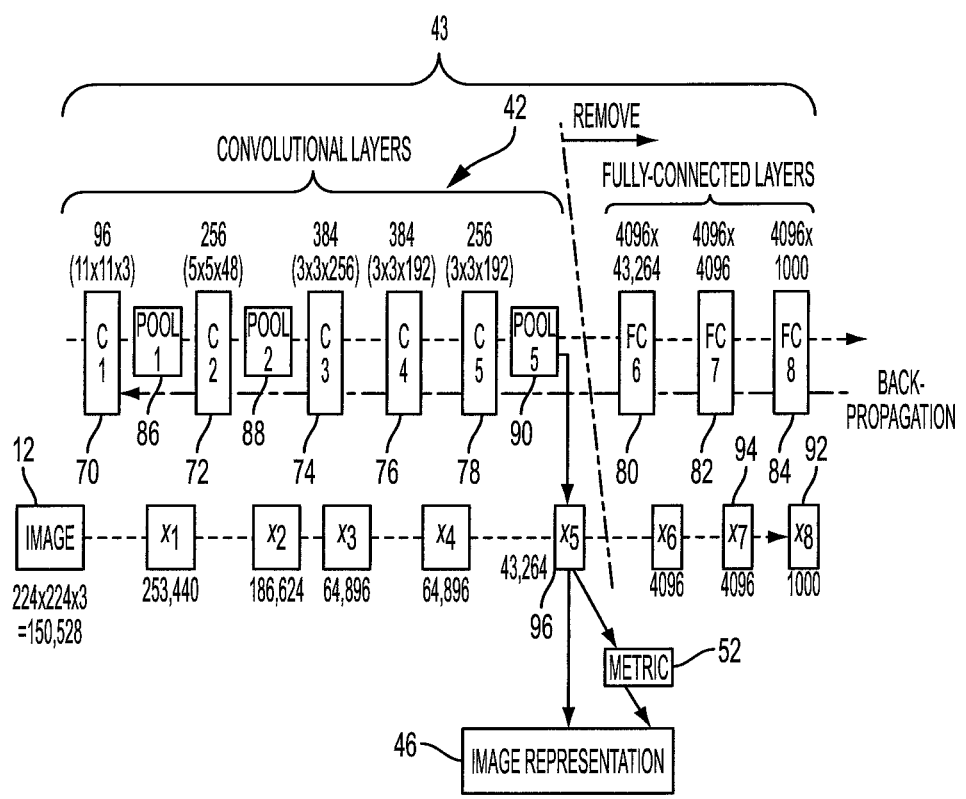
FIG. 3 illustrates a convolutional neural network in accordance with one aspect of the embodiment.

As illustrated in FIG. 3, the exemplary deep convolutional neural network 43, which is adapted for use as the model 42, is a specific realization of a neural network with special spatial arrangements of the neurons and shared weights. Such CNNs are described, for example, the Alexnet network described in A. Krizhevsky, et al., "Imagenet classification with deep convolutional neural networks," NIPS, pp. 1097-105, 2012, that describe in and K. Simonyan, et al., "Very Deep Convolutional Networks for Large-Scale Image Recognition," arxiv 1409.1556, 2014, hereinafter, Simonyan 2014. Pretrained CNNs of this type are available online, such the one available on the Visual Geometry Group Homepage, based on Simonyan 2014 (see www.robots.ox.ac.uk/~vgg/research/very_deep/).

Briefly, the CNN 43 includes a set of convolutional layers 70, 72, 74, 76, 78, denoted C1 to C5, and a set of (typically 3) fully-connected layers 80, 82, 84, denoted W6 to W8. While five convolutional layers and three fully-connected layers are shown in FIG. 3, as in the Alexnet network, it is to be appreciated that there may be fewer or more, but in general, at least one or at least two of each. For example, in the VGG16 network of Simonyan 2014, thirteen convolutional layers are used, arranged in five groups. Each convolutional layer includes of a number of neurons arranged spatially and in "channels" as follows: each neuron of a channel connects to a spatial region (the spatial region which is affected is known as the "receptive field") of neurons of all the channels in the layer below. The values of the weights of these connections are shared by all neurons (for which a neuron response can be interpreted as a convolution). Each convolutional layer 70, 72, 74, 76, 78, etc. is parametrized by a 4D tensor of weights, which is essentially a stack of 3D filters. Each fully-connected layer 80, 82, 84, etc. is parametrized by a respective weight matrix.

A non-linear function (such as a Rectified Linear Unit, or ReLU) may be applied to the neuron response (a set of activation maps) output by a given convolutional layer. The ReLU may assign a value of 0 to all negative values in the activation maps forming the respective response.

Max-pooling layers 86, 88, 90, denoted pool1, pool2, and pool5, are positioned after some or all of the convolutional layers and act on the output of the preceding convolutional layer. In the illustrated embodiment, they follow convolutional layers 70, 72, and 78 in the sequence. The max-pooling layers are layers which compute the maximum value over each receptive field rather than doing a convolution. In the exemplary embodiment, each max-pooling layer moves a window of a few pixels in width and height stepwise across one or more of the output activation maps (in some cases, the windows are overlapping) and assigns to the pixels in each window the maximum value of the pixels in the window. In an exemplary embodiment, the window is 4×4 pixels in size and the step size (or "stride") is one or two pixels, such that the windows are overlapping. The set of activation maps, $x_1$, $x_2$, $x_3$, and $x_4$, output by each convolutional layer 70, 72, 74, 76, in turn (and processed by the RELU and respective max pooling layer 86, 88, where present), thus pass to the next convolutional layer 72, 74, 76, 78, respectively, in the sequence. The output of the last convolutional layer 78 (after passing through the max-pooling layer 90) is converted to a vector $x_5$ by concatenating the rows of the output activation maps, termed flattening.

The CNN 43, when used for conventional computer vision tasks, receives as input the (R,G,B) pixel values of an image of standardized size. The first layers 70, 72, 74, 76, 78 are a concatenation of several convolutional layers sometimes followed by max-pooling layers 86, 88, 90. The exemplary model includes three max-pooling layers although fewer or more max-pooling layers may be included in the model, such as 1, 2, 4, or 5 max-pooling layers. The last, fully connected layers 80, 82, 84 are essentially a fully-connected multi-layer perceptron. The first 80 of such layers is connected to all the neurons of the preceding max-pooling layer 90. The standard output 92 of the neural network is a soft-max encoding of the task, so for a 1000-class classification problem, the output has 1000 neurons which constitute a prediction for each class.

In the exemplary neural network model 42, however, some or all of the fully-connected layers 80, 82, 84 are not employed (i.e., are only used for training of the CNN 43), and can be removed from the trained CNN to generate the model 42.

In the exemplary embodiment, the trained CNN model 42 is used as a feature extractor in a manner particularly suited to the DDD task. As opposed to using the activations of the last fully-connected layer 84, as is the case for classification, the activations 96 of a layer preceding the fully-connected layers, such as one of the convolutional layers, such as the third, fourth, or fifth convolutional layer 74, 76, 78, are used to generate a representation 46, 48 of each of the images 12, 38. As an example, the image representation is generated from the output 96, denoted $x_5$, of the last max-pooling layer 90, which follows the last (fifth) convolutional layer 78. In this case, the input image 12 (and similarly images 38) is thus processed by all five convolutional layers and three max pooling layers. The output of the max-pooling layer 90 is concatenated to form a vector, as in a conventional CNN. The vector 96 of activations may have at least 1000 elements or at least 10,000 elements and in some embodiments, up to 1000,000 or up to 50,000 elements. In another embodiment, the output of convolutional layer 78 prior to max-pooling is used to generate the image representation, by concatenation. Such representations are useful as they contain information about the image that is localized, semantic, and compressed:

Localized: In CNN architectures, such as Simonyan 2014, the response of a certain neuron in a convolutional layer only depends on pixels of a very specific region of the image.

Semantic: the weights learned in CNNs tend to correspond to convolutions with filters which represent a hierarchy of visual concepts, from low-level primitives in the lower layers (e.g., edges) to semantic concepts in the upper layers (e.g., parts of objects). See M. D. Zeiler, et al., "Visualizing and understanding convolutional networks," ECCV, pp. 818-833, 2014; Yosinski, et al., "How transferable are features in deep neural networks?" NIPS, pp. 3320-3328, 2014.

Compressed: Since the max-pooling operation reduces the number of neurons (by 4 in the case of the VGG16 network (Simonyan 2014) used in the experiments below (the max pooling window is a 2×2 window with a stride of two pixels), the pooling can be interpreted as a compression, thus the activations 96 of a max pooling layer such as pool5 90 represent a (semantic) compressed representation. Pool5 is a nomenclature that often stands for the 5th max-pooling layer, or where larger numbers of convolutional layers are used, the last in the series. In the network of Simonyan 2014, this is the max-pooling layer following the 13th convolutional layer (see Table 1, column D, of Simonyan 2014).

The vector 96 of output activations of the last max-pooling layer is a particularly useful representation for the DDD task, optionally after normalization and/or embedding in the new feature space with the learned metric 52.

Figure 4:
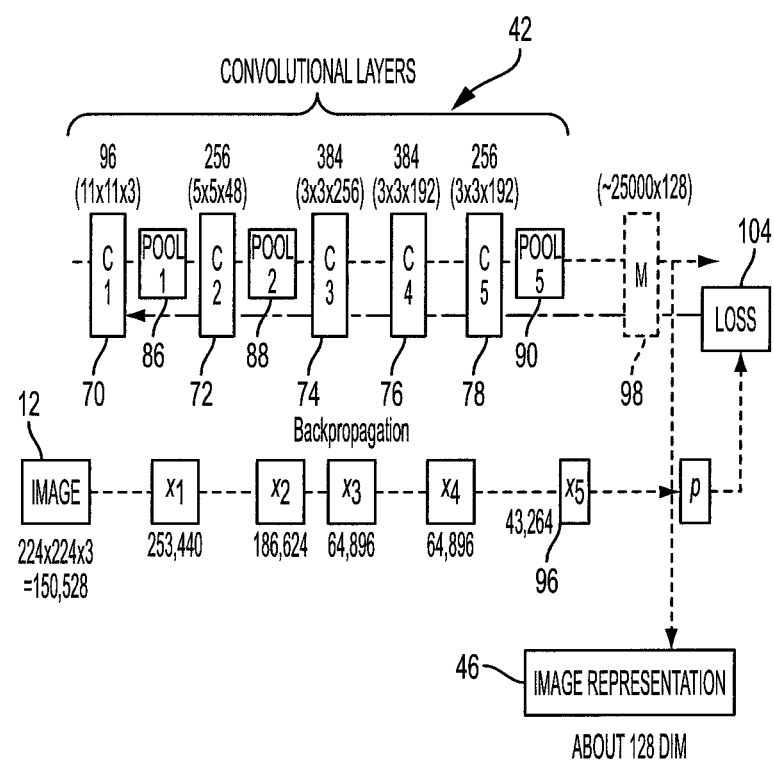
FIG. 4 illustrates a convolutional neural network-derived model in accordance with another aspect of the exemplary embodiment.

In another embodiment, a neural network model 42 illustrated in FIG. 4 is the same as that of FIG. 3, except as noted. Specifically, an additional layer 98 is added after the convolutional layers, which serves as the metric 52, to map the output activations to a new feature space. The matrix of weights for the new layer 98 (which does not exist in the pretrained CNN 43), is learned by back-propagation of a derivative of a loss, in a similar manner as for learning the weights of the convolutional layers in a conventional neural network 43.

Figure 5:
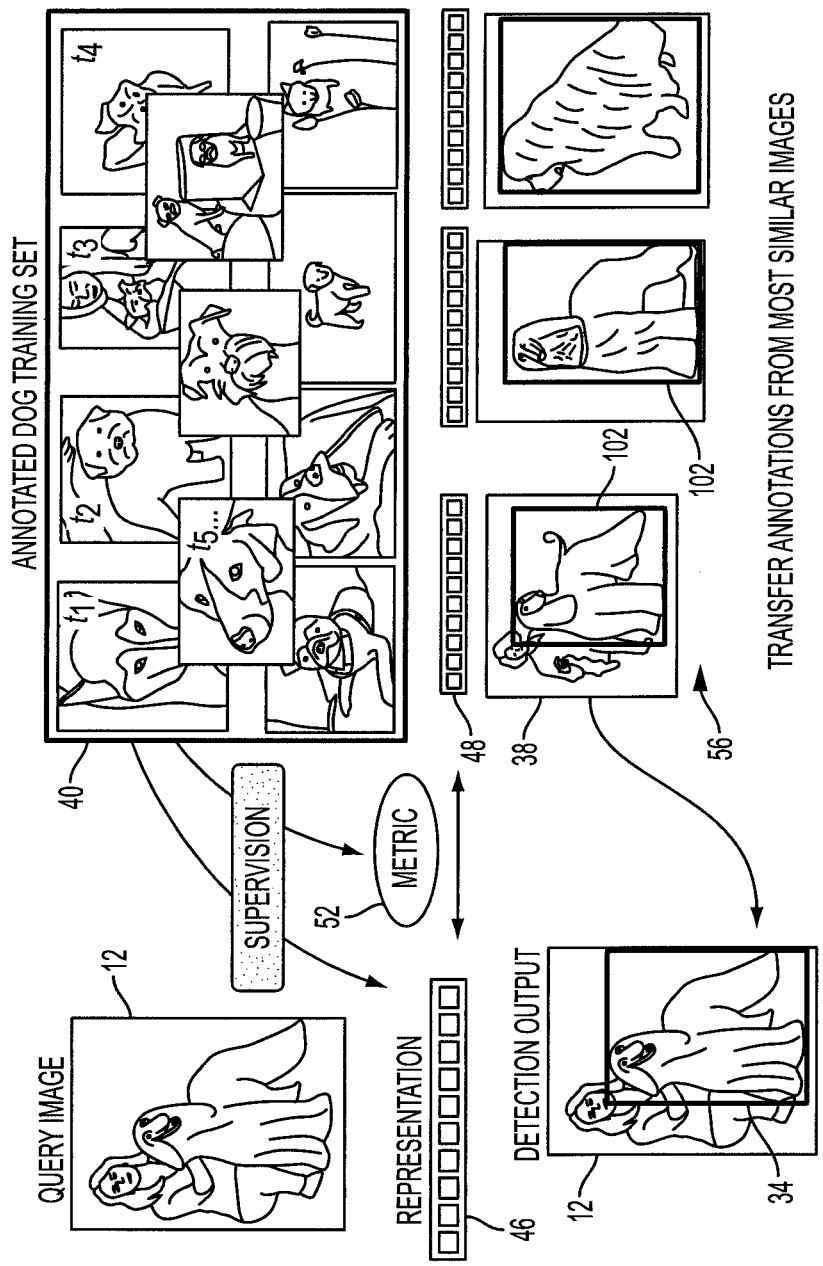
FIG. 5 illustrates segmentation based on similarity.

Three methods for using the output activations of a NN model 42 are now described. The first two employ a model as shown in FIG. 3 and the third, a model as shown in FIG. 4. In each of the methods, the similarity is computed, at S112, between a representation 46 of the query image and representations 48 of the annotated images, and the bounding box annotations 102 of the top-ranked annotated images 56 are then used (at S114) to compute a bounding box 34 for the query image 12, as graphically illustrated in FIG. 5.

1. Basic Method

In one embodiment, the output 96 of a layer of the neural network model 42, such as the last max-pooling layer 90, is used directly as features for DDD, i.e., the vector 96 is used as the respective image representation 46, 48, optionally after l2 normalization. Given the neural network model 42, as described above with reference to FIG. 3, then at S106, each of the N images 38 of the annotated set 40, $\{I_i\}_{i=1}^N$, is encoded by inputting the RGB image $I_i$ of fixed pixel dimensions to the network, and computing $t_i = p_5(I_i)$, i.e., a real-valued vector 96 containing all the output values of the pool5 layer. It is helpful to $l_2$-normalize the output values (i.e., such that $\|t_i\|_2 = 1$). In such a case, the dot product between the feature vectors of two images 12, 38 is equivalent to the cosine similarity. Then at S110, for a query image 12, denoted Q, $q = p_5(Q)$ is computed in the same manner and $l_2$-normalized. As will be appreciated, if another similarity measure which does not require normalization, such as the Euclidean distance, is used, the normalization can be omitted.

The similarities can be computed at S112, as described in Rodriguez-Serrano 2013 and U.S. Pub Nos. 20140056520 and 20130182909. In particular, all the similarities $s(q,t_i) = q^T t_i$, where T is the transpose, are computed to obtain the ranking $\pi(1) \ldots \pi(N)$, where $\pi(i)$ indicates the index of the element finishing at position i after the ranking. The output rectangle R(q) for the query image 12 can be computed as a function Y, e.g., an aggregate, such as a weighted sum, of the rectangles $R_{\pi(l)}$ of a subset L of the top-ranked annotated images 38, e.g., as:

$$R(q) = \mathcal{F}(t_{\pi(1)}, \ldots t_{\pi(L)}) = \Sigma_{l=1}^L w_l R_{\pi(l)}, \quad (1)$$

where each weight $w_l$ can be a function of the computed similarity, e.g., $w_l = s(q, t_{\pi(i)})$ and $R_{\pi(l)}$ is the ground-truth rectangle of the lth image in the subset L.

This essentially computes a weighted average of the top L rectangles. In the examples below, it is shown that such a method (even without metric learning) outperforms existing DDD methods on a dataset of images.

In the following, the terms "optimization," "minimization," and similar phraseology are to be broadly construed as one of ordinary skill in the art would understand these terms. For example, these terms are not to be construed as being limited to the absolute global optimum value, absolute global minimum, and so forth. For example, minimization of a function may employ an iterative minimization algorithm that terminates at a stopping criterion before an absolute minimum is reached. It is also contemplated for the optimum or minimum value to be a local optimum or local minimum value.

2. Metric Learning Method

In this embodiment, a metric learning algorithm 50 and a set of annotated training images, analogous to images 38, are used to obtain an improved similarity function of the form $s(q, t_i) = q^T U^T U t_i$, where q is a query image representation and $t_i$ is one of the annotated image representations, by learning an optimal value of a metric 52 in the form of a projection matrix U. Rodriguez-Serrano 2013 describes such an algorithm, and an implementation to find U by minimizing a loss function of the general form:

$$\mathcal{L}(U) = \sum_{\substack{\forall t, t^+, t^- \\ s.t.\ \Psi(R,R^+) > \Psi(R,R^-)}} \max(0, k_w(t, t^-) - k_w(t, t^+) + \Delta) \quad (2)$$

e.g., with stochastic gradient descent (SGD). This learning takes triplets: a first annotated image t and two other annotated images, $t^+$ and $t^-$, where the overlap score $\Psi(R, R^+)$ between the bounding box $R^+$ of image $t^+$ and the bounding box R of t is greater than the overlap score $\Psi(R,R^-)$ between the bounding box $R^-$ of image $t^-$ and the bounding box R of t For each triplet, the learning component 50 computes $k_w$ for the pairs $(t,t^-)$ and $(t,t^+)$, where $k_w(t,t^-) = t^T U^T U t^-$ and $k_w(t,t^+) = t^T U^T U t^+$, U is the metric 52 being learned (here t, $t^+$ and $t^-$ are the optionally normalized representations 96 of the three training images), and $\Delta$ is a constant, such as 1. The overlap score $\Psi$ may be computed as the area of intersection divided by the area of the union of the two bounding boxes. The weights of the matrix U are updated when the weighted similarity $k_w(q,t)$ between the two image representations is higher for the pair $(t,t^-)$ than that for the pair $(t,t^+) - \Delta$. This results in a matrix where the annotated images with a higher bounding box overlap are likely to be considered more similar in the new feature space.

In the metric learning, the matrix 52 may be initialized with a set of weights, such as equal weights or weights randomly drawn, e.g., from a Gaussian distribution. The matrix may have the same number of dimensions as the input vector 96 in one dimension and a different, e.g., smaller, number of dimensions in the other, such that the output vector generated by multiplying the matrix with the input vector may have fewer dimensions than the input vector. However, equal sized or larger output vectors are also contemplated.

For further details on the learning of the projection matrix W, see also above-mentioned U.S. Pub. No. 20130182909.

Once the metric 52 has been learned (S122, FIG. 2), the method proceeds as for method 1, but using the similarity function $s(q, t_i) = q^T U^T U t_i$ at S112. Optionally, the function $U t_i$ can be precomputed for all the annotated images 38 and stored in memory, so that at test time, this is simply multiplied by $q^T U^T$. This has two advantages: The quantities Uq and $U t_i$ can be l2-normalized; and the dimensionality of the space in which the dataset images are kept can be controlled with U, so this can be used as an explicit dimensionality reduction.

3. CNN End-to-End Learning

Instead of learning a projection of the pool5 features 96 (computed using a fixed CNN architecture), the projection can be interpreted as an extra hidden layer 98 after the pool5 layer 90, as illustrated in FIG. 4. In this embodiment, all the parameters (i.e., the weights of the projection layer 98 and all the weights of the previous convolutional layers 70, 72, 74, 76, 78) of such a CNN model 42 are learned, e.g., through backpropagation. Layer 98 is a matrix, analogous to metric U, which takes in a vector from the max-pooling layer 90 and outputs an image representation in the new feature space by multiplying the vector with the matrix.

This is equivalent to updating the parameters of a part of a pretrained network (such as a network with the VGG16 architecture of Simonyan) with a ranking loss analogous to Eq. 2, rather than a classification loss. Since the fully-connected layers are omitted, the ranking loss is back-propagated through the remaining convolutional layers.

To learn a model 42 which optimizes the DDD task, the trained CNN (with the fully-connected layers removed) may be learned to optimize the ranking loss:

$$\mathcal{L}(U) = \sum_{\substack{\forall p, p^+, p^- \\ s.t.\ \Psi(R,R^+) > \Psi(R,R^-)}} \max(0, p^T, (p^- - p^+) + \Delta), \quad (3)$$

Where each p, $p^+$ and $p^-$ denotes a respective output of the CNN (i.e., the activations of layer 98) for one of a set of annotated training images (the same or analogous to images 38) that are used to train the model 42. Then, to perform SGD learning with backpropagation through each of the layers 98, 78, 76, 74, 72, 70 in turn (i.e., in the reverse order to the direction in which the image is processed), the derivatives (gradients) of the ranking loss 104, with respect to the output variables:

$$\frac{\partial L}{\partial p} = p^- - p^+ \quad (4)$$

$$\frac{\partial L}{\partial p^+} = -p \quad (5)$$

$$\frac{\partial L}{\partial p^-} = p \quad (6)$$

The vector of these derivatives of the loss is backpropagated through the model by first multiplying the vector of the loss 104 by the layer 98 weights, and computing the derivative of the loss, and using the new loss to update the weights of C5, then to C4, and so on, in the conventional manner. The rest of the backpropagation equations are independent of the loss and remain the same for all tasks, given a network architecture. Software libraries such as Gaffe (Y. Jia, Y, et al., "Gaffe: Convolutional Architecture for Fast Feature Embedding," arXiv preprint arXiv:1408.5093, 2014), offer "blackbox" SGD learning with back-propagation for any input loss function and architecture. For the loss function, the user codes a function that evaluates the loss of a mini-batch of training images and the derivatives. The above loss function and derivatives correspond to a mini-batch of size 1, but they are readily extendable to a larger value. The learning algorithm for leaning the parameters of the layer 98 can be similar to that used in Hoffer, et al., "Deep metric learning using Triplet network," arXiv: 1412.6622, 2014. However, other methods for learning which use triplets are also contemplated.

In order to perform such a learning, a dataset of annotated training images with values of $\Psi(R,R')$ is provided, such as the one used for metric learning in method 2. However, since the size of such dataset is typically smaller than the datasets used for the initial CNN learning, it is advantageous simply to update the parameters of the pretrained CNN, rather than learning them from scratch. The model 42 is therefore initialized with the pre-trained CNN 43 and then several iterations are performed with the new data.

The method thus leverages a CNN 43 trained for one task (classification) on one dataset (typically, ImageNet®) for another task (DDD) by retraining it on another dataset (a detection dataset) with small amounts of data.

Once the network 43 has been adapted as described above (S124, FIG. 2), the method proceeds as for method 1, e.g., using the dot product of the similarities in S112.

The exemplary system and method find application for a variety of object detection tasks, such as image thumbnailing, product identification on small screens, categorization, and information extraction. One particular application is the detection of license plates in images, for use in such applications as electronic toll collection, traffic enforcement, and off-street parking management. Having a more accurate system to perform these task is beneficial for these applications.

Without intending to limit the scope of the exemplary embodiments, the following examples demonstrate the applicability of the method on an annotated image dataset.

EXAMPLES

The DDD task was evaluated on the Leeds Sports Pose Extended training Dataset. See, Johnson, et al., "Clustered pose and nonlinear appearance models for human pose estimation," Proc. 21st British Machine Vision Conference, 2010 (BMVC2010). The image dataset is accessible at www.comp.leeds.ac.uk/mat4saj/lspethtml. The same experimental conditions as in Rodriguez-Serrano 2013 were used for comparison purposes. This is a prominent person detection task (where the subject is in a challenging "sportive" pose. This dataset contains 10,000 images gathered from Flickr searches for the tags 'parkour', 'gymnastics', and 'athletics' and consists of poses deemed to be challenging to estimate. Each image has a corresponding annotation gathered from Amazon Mechanical Turk and as such cannot be guaranteed to be highly accurate. The images have been scaled such that the annotated person is roughly 150 pixels in length. Each image has been annotated with up to 14 visible joint locations. Mechanical Turk workers were asked to label left and right joints from a person-centric viewpoint.

For these experiments the VGG16 network, pre-trained by the Visual Geometry Group at Oxford University on the ILSVRC2012 (Imagenet release for 2012) dataset (see Simonyan 2014, Table 1, col. D, and the Visual Geometry Group Homepage), was used. The input is a 224×224 RGB image. The CNN contains sixteen layers with weights; the first thirteen are convolutional and the remaining three are fully-connected as shown in TABLE 1.

TABLE 1

VGG16 network

| Configuration | |
|---|---|
| Convolutional layers | |
| 1 | 3-64 |
| 2 | 3-64 |
| maxpool | |
| 3 | 3-128 |
| 4 | 3-128 |
| maxpool | |
| 5 | 3-256 |
| 6 | 3-256 |
| 7 | 3-256 |
| maxpool | |
| 8 | 3-512 |
| 9 | 3-512 |
| 10 | 3-512 |
| maxpool | |
| 11 | 3-512 |
| 12 | 3-512 |
| 13 | 3-512 |
| maxpool | |
| Fully Connected layers | |
| 14 | 4096 |
| 15 | 4096 |
| 16 | 1000 |
| softmax | |

For the convolutional layers, the first number indicates the filter size and the second the number of filters, so, for example, cony 3-512 means 512 filters of size 3×3. The stride for the convolutions is always 1. The max-pooling is always of size 2×2 with a stride of 2, and there is a ReLU after every convolution layer.

The output of the last fully-connected layer is fed to a 1000-way softmax which produces a distribution over the 1000 class labels. The network has been trained to maximize the multinomial logistic regression objective, which is equivalent to maximizing the average across training cases of the log-probability of the correct label under the prediction distribution. Response-normalization layers follow the first and second convolutional layers. Max-pooling layers follow both response-normalization layers as well as the fifth convolutional layer. The ReLU non-linearity is applied to the output of every convolutional and fully-connected layer.

Each image of the ELSP set to is input to the CNN (after removal of the fully-connected layers) and the activations of the pool5 layer are extracted as features ($l_2$-normalized).

The features extracted from the 1st fully connected layer (FC6) are also evaluated. While this layer is more semantic and compressed than pool5, it is not localized, as it receives input from all the (localized) activations of pool5 neurons. This is to verify that localized information is useful for the DDD task.

The results were compared with:

1. The DDD method of Rodriguez-Serrano 2013, which uses Fisher Vectors (~32K dimensions) with metric learning, and 2. A DDD method which uses probability maps computed from local SIFT and color features and metric learning, similar to that described in U.S. Pub. No. 20140270350.

The accuracy results are shown in TABLE 2. The accuracy is measured in terms of precision. It measure the percentage of images for which the retrieved rectangle has an intersection over union with the ground-truth larger than 0.5.

TABLE 2

| Method | Accuracy |
| --- | --- |
| Fisher vectors with metric learning | 43.1% |
| Probability maps | 44.5% |
| FC6 (no metric learning-method 1) | 38.4% |
| Pool5 (no metric learning-method 1) | 53.2% |
| Pool5 (with metric learning-method 2) | 75.9% |

It can be seen that the features coming from the fully-connected layer 80 (FC6) of the CNN perform relatively well on this dataset for the object localization task. However, pool5 90 gives better results than FC6, suggesting that the features carry "localized" information. When combining metric learning with pool5 features (method 2), the results are excellent (75.9%), almost doubling the two baseline methods (Fisher Vectors and probability maps).

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for object localization in a query image, comprising:
with a processor:
for each of a set of annotated images, with a model derived from part of a pre-trained neural network, the model including a sequence of convolutional layers, generating an annotated image representation based on activations output by a layer of the model, the annotated images each being annotated with object location information;
for a query image, generating a query image representation based on activations output by the layer of the model;
identifying a subset of similar annotated images from the set of annotated images, the identifying comprising computing a similarity between the query image representation and each of the annotated image representations;
transferring object location information from at least one of the subset of similar annotated images to the query image; and
outputting information based on the transferred object location information.

2. The method of claim 1, wherein the layer is preceded by at least three convolutional layers in the model.

3. The method of claim 1, wherein the layer of the model is a max-pooling layer.

4. The method of claim 3, wherein the max-pooling layer is the max-pooling layer immediately before a first fully-connected layer of the trained neural network.

5. The method of claim 1, wherein the similarity between the query image representation and each of the annotated image representations is computed as a cosine similarity between the representations.

6. The method of claim 1, where the similarity between the query image representation and each of the annotated image representations is computed is computed in a feature space by projecting the image representation and each of the annotated image representations with a learned metric.

7. The method of claim 6, further comprising learning the metric using a set of annotated training images to optimize a loss function.

8. The method of claim 6, further comprising jointly learning the metric and adapting the convolutional weights of the model by backpropagation.

9. The method of claim 8, comprising introducing a layer to the model after the last convolutional layer of the model, the layer serving as the metric.

10. The method of claim 1, wherein the output information comprises at least one of a bounding box for localizing an object in the query image and information extracted from the bounding box.

11. The method of claim 10, wherein the information extracted includes text extracted from a region of the image bounded by the bounding box.

12. The method of claim 11, wherein the information extracted comprises a license plate number.

13. The method of claim 1, wherein the providing of the annotated image representation comprises inputting the pixels of the annotated image into the model and outputting the activations of the layer of the model as a vector.

14. The method of claim 1, wherein the model comprises a sequence of convolutional layers which each receive as input output activations of a prior convolutional layer or the image in the case of a first convolutional layer.

15. The method of claim 1, further comprising ranking the annotated images based on the computed similarity and wherein the transferring object location information from at least one of the subset of annotated images to the query image comprises computing a weighted sum of bounding box annotations of the annotated images in the subset, the weights being based on the rankings of the annotated images in the subset.

16. A computer program product comprising a non-transitory recording medium storing instructions, which when executed on a computer, causes the computer to perform the method of claim 1.

17. A system comprising memory which stores instructions for performing the method of claim 1 and a processor in communication with the memory for executing the instructions.

18. A system for object localization in a query image, comprising:
memory which stores a model derived from a trained neural network, the model comprising a sequence of convolutional layers which receive as input output activations of a prior convolutional layer or an image in the case of a first convolutional layer;
a representation generator which generates a representation of a query image based on the activations of a selected one of the convolutional layers for the query image and an annotated image representation for each of a set of annotated images based on activations output by the selected layer of the model for the annotated image, the annotated images each being annotated with object location information;
a retrieval component which retrieves a subset of similar images from the set of annotated images, based on a similarity between respective representations;
a segmentation component which transfers the object location information from at least one of the subset of annotated images to the query image;
an output component which outputs information based on the transferred object location information; and a processor which implements the representation generator, retrieval component, segmentation component, and output component.

19. The system of claim 18, further comprising a metric learning component which jointly learns a metric for projecting the image representations into a new feature space and adapts weights of the convolutional layers of the model by backpropagation.

20. A method for object localization in a query image, comprising:

with a processor:

adding a new layer to a pre-trained neural network to generate a model comprising a sequence of convolutional layers which each act on the output of a respective previous layer, the new layer being positioned after the last of the convolutional layers;

using a set of annotated training images, updating a matrix of weights of the new layer and weights of the convolutional layers of the model by backpropagation to optimize a loss function;

for each of a set of annotated images, generating an annotated image representation based on activations output by the new layer of the model, the annotated images each being annotated with object location information;

for a query image, generating a query image representation based on activations output by the new layer of the model;

identifying a subset of the annotated images comprising computing a similarity between the query image representation and each of the annotated image representations;

transferring object location information from at least one of the subset of annotated images to the query image; and outputting information based on the transferred object location information.

* * * * *